(12) United States Patent
Liu

(10) Patent No.: US 7,387,310 B1
(45) Date of Patent: Jun. 17, 2008

(54) FOLDABLE BABY TRAILER

(76) Inventor: Cheh-Kang Liu, 5F., No. 41, Alley 3, Lane 91, Sec. 4, Pa Te Rd., Taipei (TW)

(*) Notice: Subject to any disclaimer, the term of this patent is extended or adjusted under 35 U.S.C. 154(b) by 147 days.

(21) Appl. No.: 11/486,221

(22) Filed: Jul. 14, 2006

(51) Int. Cl.
*B62B 7/00* (2006.01)
*B62B 3/00* (2006.01)
*B62B 1/00* (2006.01)

(52) U.S. Cl. ............... 280/642; 280/641; 280/643; 280/647; 280/648; 280/657; 280/658; 280/47.38

(58) Field of Classification Search ............... 280/642, 280/641, 643, 647, 648, 657, 658, 416, 47.38
See application file for complete search history.

(56) References Cited

U.S. PATENT DOCUMENTS

| | | | |
|---|---|---|---|
| 5,460,395 A * | 10/1995 | Chen | 280/204 |
| 5,669,618 A * | 9/1997 | Chiu | 280/204 |
| 5,743,552 A * | 4/1998 | Baechler et al. | 280/642 |
| 5,785,333 A * | 7/1998 | Hinkston et al. | 280/204 |
| 5,984,332 A * | 11/1999 | Beaudoin et al. | 280/204 |
| 6,705,628 B2 * | 3/2004 | Kahmann | 280/204 |
| 6,896,275 B1 * | 5/2005 | Liu | 280/204 |
| 6,976,697 B2 * | 12/2005 | Britton et al. | 280/647 |
| 6,991,249 B2 * | 1/2006 | Shapiro | 280/648 |
| 7,172,206 B2 * | 2/2007 | Staszak | 280/204 |
| 2002/0074764 A1 * | 6/2002 | Allen et al. | 280/204 |
| 2002/0096857 A1 * | 7/2002 | Valdez et al. | 280/293 |
| 2003/0193172 A1 * | 10/2003 | Lin | 280/642 |

* cited by examiner

*Primary Examiner*—Christopher Ellis
*Assistant Examiner*—John R Olszewski
(74) *Attorney, Agent, or Firm*—Troxell Law Office, PLLC

(57) ABSTRACT

A foldable baby trailer includes a bottom frame, detachably provided with two rear wheels, two rear frame bars, a handlebar, a top frame bar, two front frame bars, and a trailer bar provided with a front wheel. The handlebar, the top frame bar, the two rear frame bars and the two front frame bars can be directly folded up and closely attached to the bottom frame to reduce the size for storage when the two bottom ends of the handlebar are unlocked from the two rear frame bars. Further, the user can grasp the top grip of the handlebar with the hands to push/pull the foldable baby trailer and to use the foldable baby trailer as an independent baby cart after disconnection of the trailer bar from the bicycle.

2 Claims, 5 Drawing Sheets

FOLDABLE BABY TRAILER

BACKGROUND AND SUMMARY OF THE INVENTION

The present invention relates to a baby trailer and more specifically, to a foldable baby trailer, which can conveniently be collapsed to reduce the size convenient for carrying, storage or delivery and, which has a handlebar and front and rear wheels practical for uses as an independent baby cart when it is not used with a bicycle.

U.S. Pat. No. 5,669,618 discloses a bicycle trailer, which has a connecting device adapted to be fastened on the frame body of a bicycle so as to be towed by the bicycle and which can be detached easily from the bicycle for storage. This structure of bicycle trailer is functional, however, it still has drawbacks as follows:

1. Because the bicycle trail does not have handle means or a front wheel, it cannot be used as an independent baby cart when detached from the bicycle.

2. When wishing to collapse the bicycle trailer, the user must unlock the knob at the rear top side and then detach the top reinforcing rod before folding the trailer frame. This procedure is complicated.

The present invention has been accomplished under the circumstances in view. According to one aspect of the present invention, the foldable baby trailer is comprised of a bottom frame detachably provided with two rear wheels, two rear frame bars, a handlebar, a top frame bar, two front frame bars, and a trailer bar provided with a front wheel. The handlebar, the top frame bar, the two rear frame bars and the two front frame bars can be directly folded up and closely attached to the bottom frame to reduce the size for storage when the two bottom ends of the handlebar are unlocked from the two rear frame bars.

According to another aspect of the present invention, the user can grasp the top grip of the handlebar with the hands to push/pull the foldable baby trailer after disconnection of the trailer bar from the bicycle, i.e., the foldable baby trailer can be used as an independent baby cart when detached from the bicycle.

DETAILED DESCRIPTION OF THE INVENTION

Figure 1:
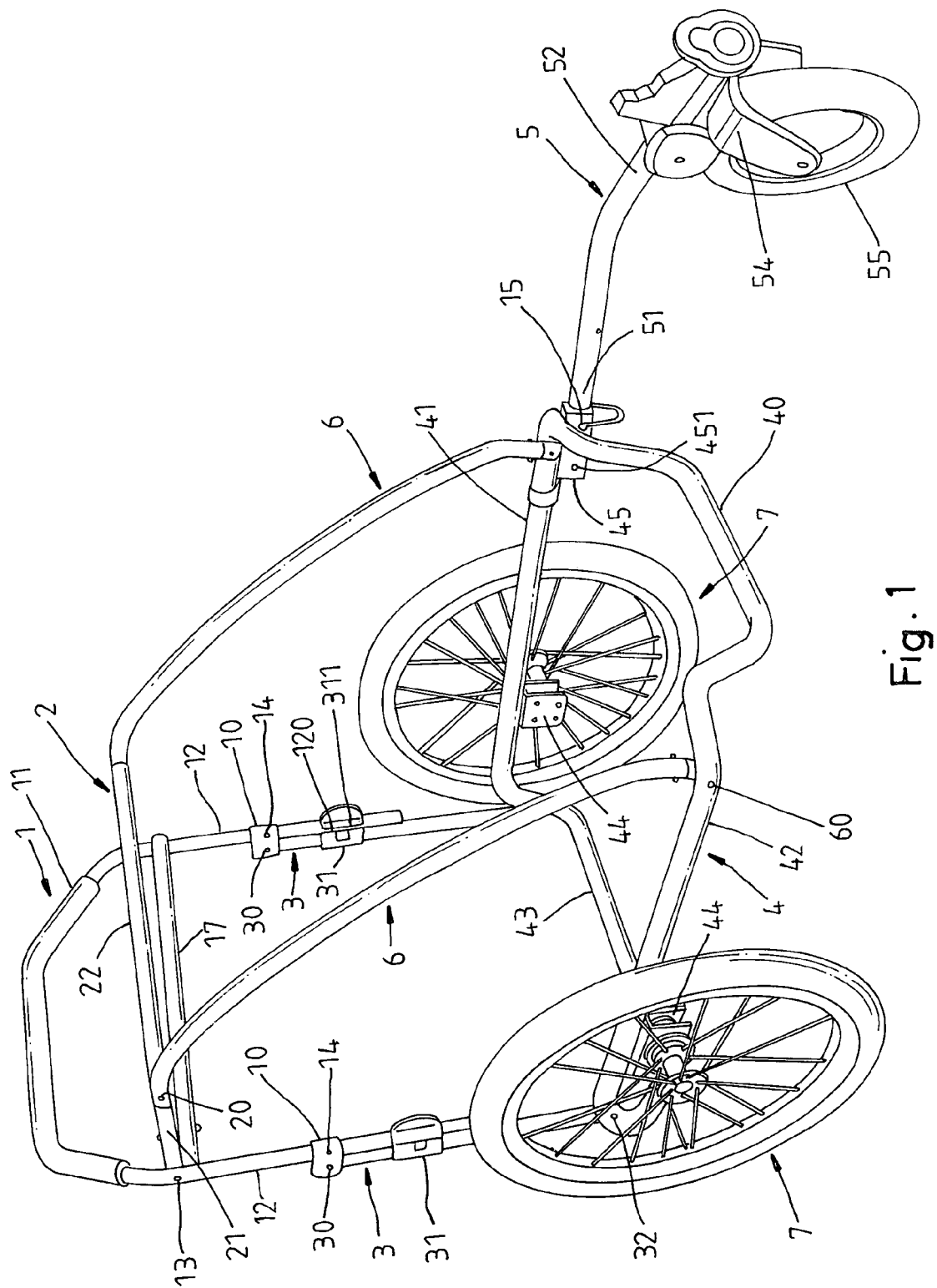
FIG. 1 is perspective view of the frame structure of a foldable baby trailer according to the present invention.
Figure 2:
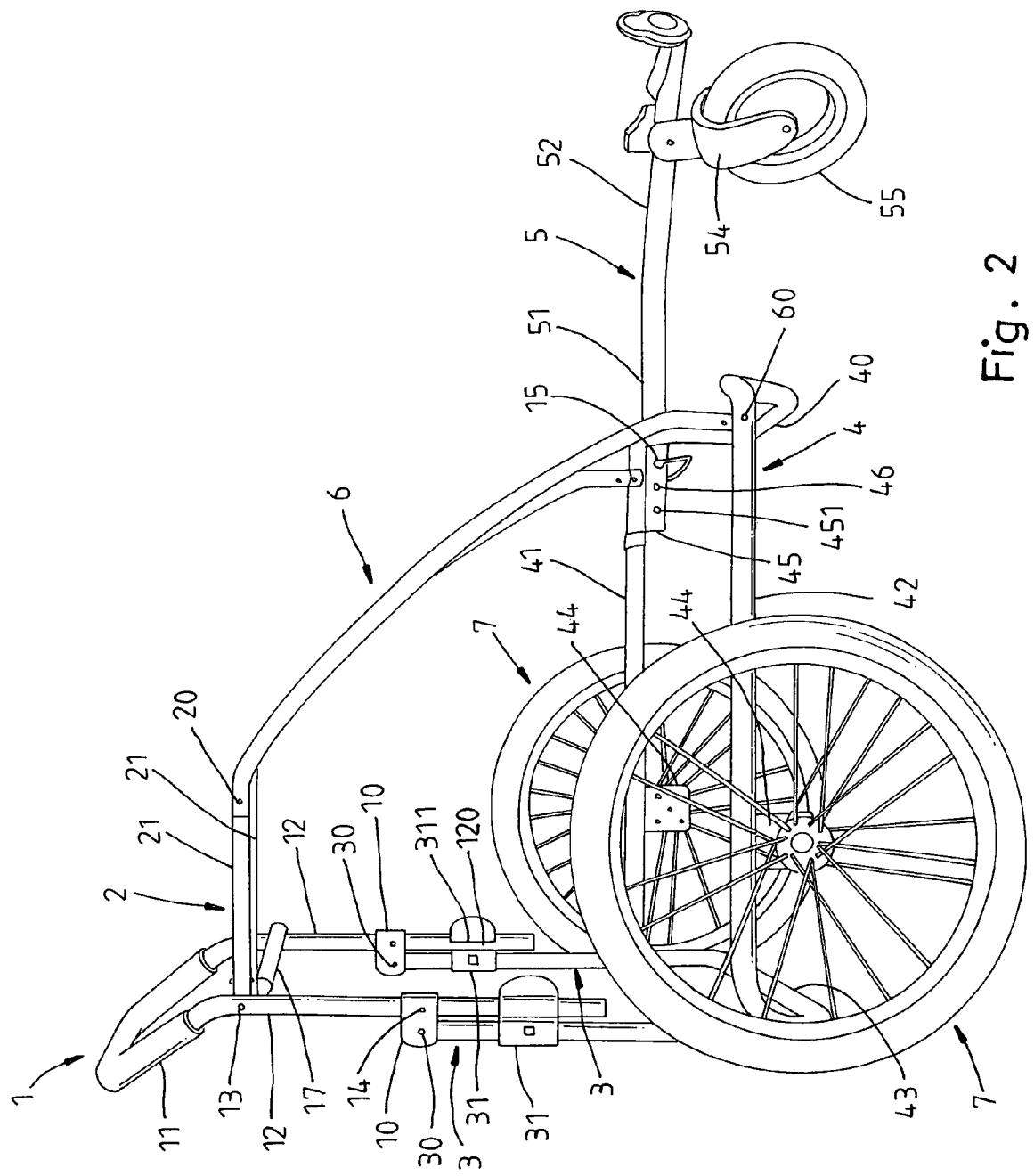
FIG. 2 is another perspective view of the frame structure of the foldable baby trailer according to the present invention when viewed from another angle.

Referring to FIGS. 1 and 2, a foldable baby trailer in accordance with the present invention is shown comprising a handlebar 1, a top frame bar 2, two rear frame bars 3, two front frame bars 6, a bottom frame 4, and a trailer bar 5.

The handlebar 1 comprises a top grip 11 and two bottom rods 12 respectively downwardly extending from the two ends of the top grip 11. The bottom rods 12 each have a U-lug 10 fixedly secured to a middle part thereof with a respective fastening member 14.

The top frame bar 2 is a substantially U-shaped frame bar comprising a transverse rod 22 disposed on the middle and two endpieces 21 respectively extended from the two distal ends of the transverse rod 22 at right angles and respectively pivoted to the bottom rods 12 of the handlebar 1 adjacent to the top grip 11 with a respective pivot pin 13.

The bottom frame 4 comprises a transverse front rod 40, a transverse rear rod 43, two side rods 41 and 42 respectively connected between the two ends of the transverse front rod 40 and the two ends of the transverse rear rod 43 and arranged in parallel, two wheel holders 44 respectively affixed to the side rods 41 and 42 of the bottom frame 4 to support two rear wheels 7, and a holder frame 45 affixed to one side rod 41 adjacent to the transverse front rod 40 at the bottom side. The holder frame 45 has a front locating hole (not shown) and a rear locating hole 451.

The two front frame bars 6 are smoothly arched frame bars, each having a top end respectively pivoted to the end pieces 21 of the top frame bar 2 adjacent to the transverse rod 22 with a respective pivot pin 20 and a bottom end respectively pivoted to the two parallel side rods 41 and 42 of the bottom frame 4 adjacent to the transverse front rod 40 with a respective pivot pin 60.

The two rear frame bars 3 each have a top end respectively pivoted to the U-lugs 10 at the bottom rods 12 of the handlebar 1 with a respective pivot pin 30, a middle part provided with a swivel hook plate 31, which has a retaining portion 311 for retaining the bottom ends 120 of the bottom rods 12 of the handlebar 1, and a bottom end respectively pivoted to the two distal ends of the transverse rear rod 43 of the bottom frame 4 with a respective pivot pin 32.

The trailer bar 5 has one end, namely, the rear end 51 pivotally connected to the holder frame 45 of the bottom frame 4 with a pivot pin 46, and the other end, namely, the front end 52 fixedly mounted with a wheel holder 54 that supports a front wheel 55. Further, the wheel holder 54 has a part connectable to a tricycle (not shown). Further, a lock pin 15 is inserted through the front locating hole (not shown) of the holder frame 45 of the bottom frame 4 and a through hole (not shown) on the trailer bar 5 to lock the trailer bar 5 to the holder frame 45.

Figure 3:
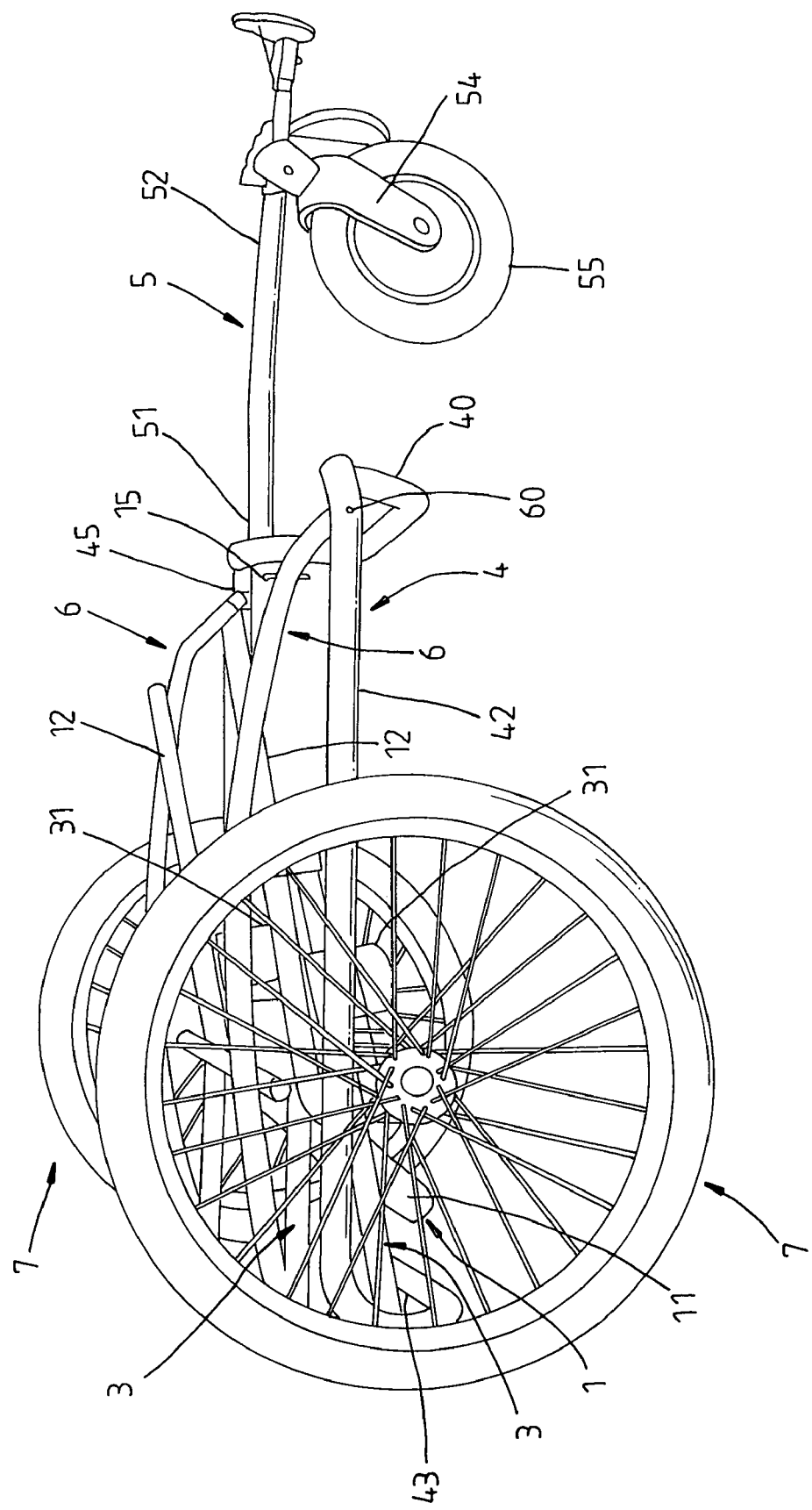
FIG. 3 is a perspective view of the present invention showing a collapsed status of the frame structure of the foldable baby trailer.
Figure 4:
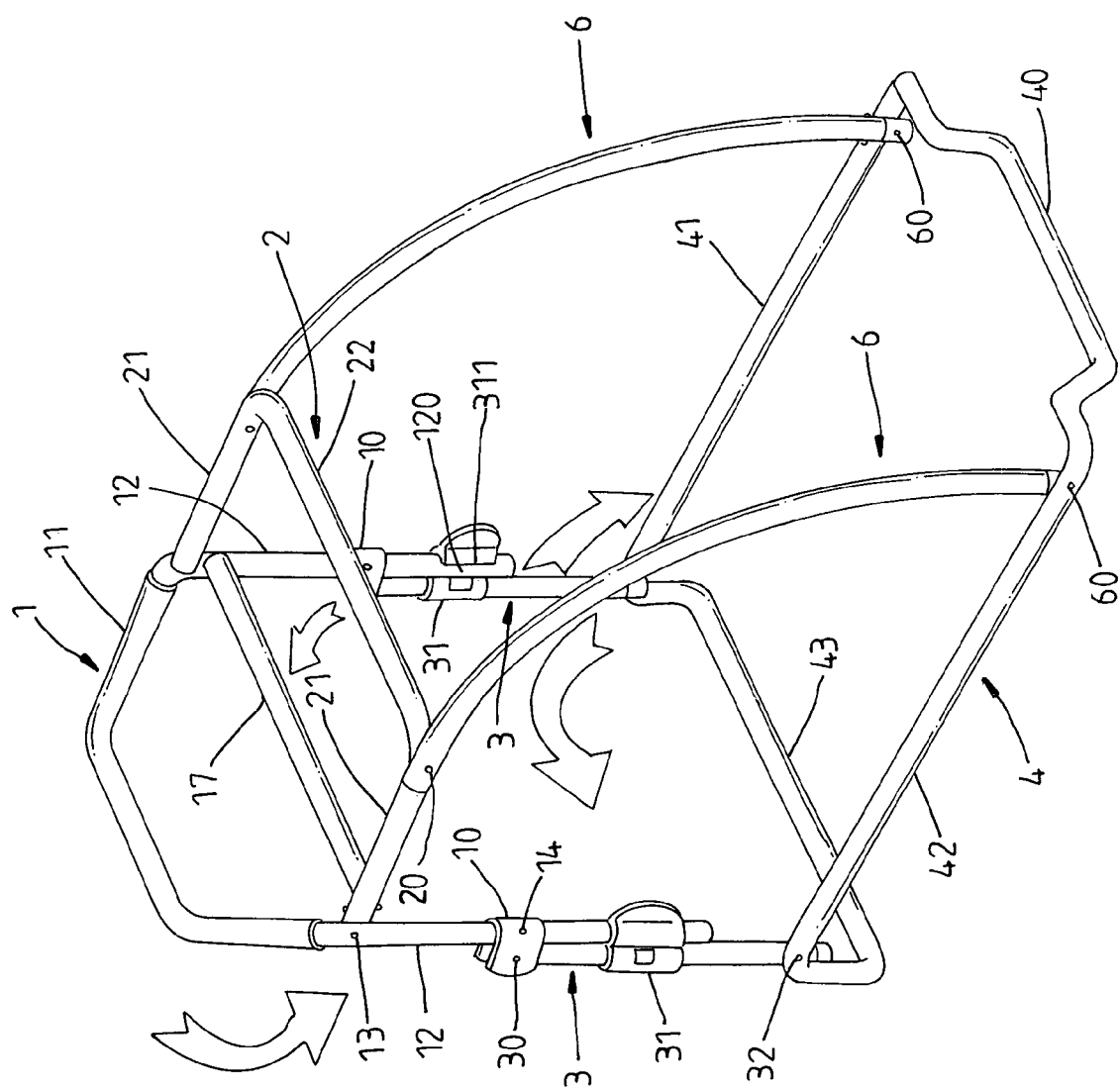
FIG. 4 is a schematic drawing showing a folding action of the frame structure of the foldable baby trailer according to the present invention.
Figure 5:
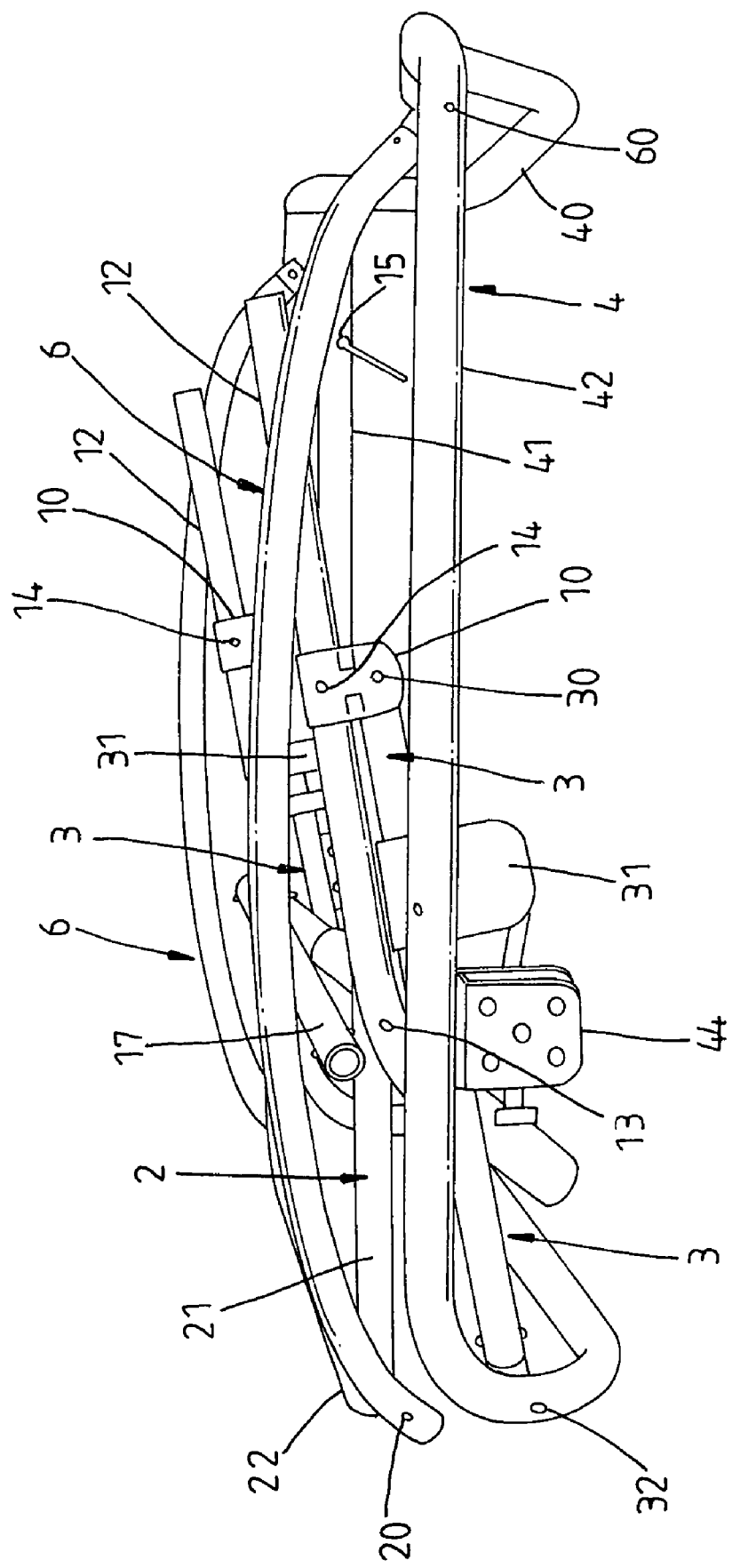
FIG. 5 illustrates a collapsed status of a part of the frame structure of the foldable baby trailer according to the present invention.

Referring to FIGS. 3~5, when wishing to collapse the foldable baby trailer, turn the swivel hook plates 31 outwardly away from the bottom ends 120 of the bottom rods 12 of the handlebar 1, and then turn the handlebar 1 downwards (see the arrowhead sign in FIG. 4) for enabling the top frame bar 2 to be simultaneously received to the handlebar 1 and the two front frame bars 6 to be received to the bottom frame 4, and then turn the two rear frame bars 3 downwards for enabling the two rear frame bars 3 to be closely attached to the bottom frame 4. The front wheel 55 and the two rear wheels 7 may be respectively detached from the respective wheel holders 54 and 44 to save storage space. Further, the lock pin 15 may be removed from the trailer bar 5 and the holder frame 45, for enabling the trailer bar 5 to be turned about the pivot 46 relative to the bottom frame 4 from the extended position (see FIGS. 1 and 2) to the received position where the trailer bar 5 is closely attached to the bottom side of the bottom frame 4. At this time, the lock pin 15 can be inserted into the locating hole (not shown)

of the trailer bar 5 and the rear locating hole 451 of the holder frame 45 to lock the trailer bar 5 in the received position.

Further, a reinforcing transverse rod 17 is connected between the two bottom rods 12 of the handlebar 1 to reinforce the structural strength.

The aforesaid two swivel hooks 31 are pivotally connected to the rear frame bars 3 and turnable about the rear frame bars 3 between the locking position to lock the bottom ends 120 of the bottom rods 12 of the handlebar 1 and the unlocking position to release the bottom ends 120 of the bottom rods 12 of the handlebar 1 from the constraint. These two swivel hooks 31 are of the known art. Other lock means may be used as a substitute.

As indicated above, the invention has the following advantages:

1. The handlebar 1, the top frame bar 2, the two rear frame bars 3 and the two front frame bars 6 can be received to the bottom frame 4 to save storage space.

2. When detached from the bicycle, the foldable baby trailer can be used as an independent baby cart, and the child can hold the top grip 11 of the handlebar 1 to push/pull the trailer with the hands.

3. The user can detach the front rear 51 and the rear wheels 7 and receive the trailer bar 5 to the bottom side of the bottom frame 4 to save storage space.

What is claimed is:

1. A foldable baby trailer comprising a bottom frame equipped with two rear wheel assemblies, a foldable trailer bar pivoted to said bottom frame and connectable to a bicycle, a front wheel assembly mounted on one end of said foldable trailer bar, a handlebar, a top frame bar, two rear frame bars and two front frame bars, wherein:

said handlebar comprises a top grip and two bottom rods respectively downwardly extending from two distal ends of said top grip, said bottom rods each having a top end fixedly connected to said top grip, a bottom end, and a U-lug fixedly secured to a middle part thereof between the top end and the bottom end;

said top frame bar comprises a transverse rod and two end pieces respectively extended from two distal ends of said transverse rod at right angles and respectively pivoted to the top ends of the bottom rods of said handlebar;

said bottom frame comprises a transverse front rod, a transverse rear rod, two side rods respectively connected between two ends of said transverse front rod two ends of said transverse rear rod and arranged in parallel, two wheel holders respectively affixed to said side rods to support a respective rear wheel, and a holder frame affixed to a bottom side of one of said side rods adjacent to said transverse front rod, said two front frame bars each have a top end respectively pivoted to the end pieces of said top frame bar adjacent to the transverse rod of said top frame bar and a bottom end respectively pivoted to the two side rods of said bottom frame adjacent to said transverse front rod;

said two rear frame bars each have a top end respectively pivoted to the U-lugs at the bottom rods of said handlebar, a middle part, a swivel hook pivoted to the middle part and adapted to lock the bottom ends of the bottom rods of said handlebar, and a bottom end respectively pivoted to two distal ends of the transverse rear rod of said bottom frame.

2. The foldable baby trailer as claimed in claim 1, further comprising a reinforcing transverse rod connected between said two bottom rods of said handlebar.

\* \* \* \* \*